Oct. 2, 1923.
C. E. RISLEY
1,469,536
PACKING BOX FOR POTTED PLANTS
Filed July 14, 1921    2 Sheets-Sheet 1
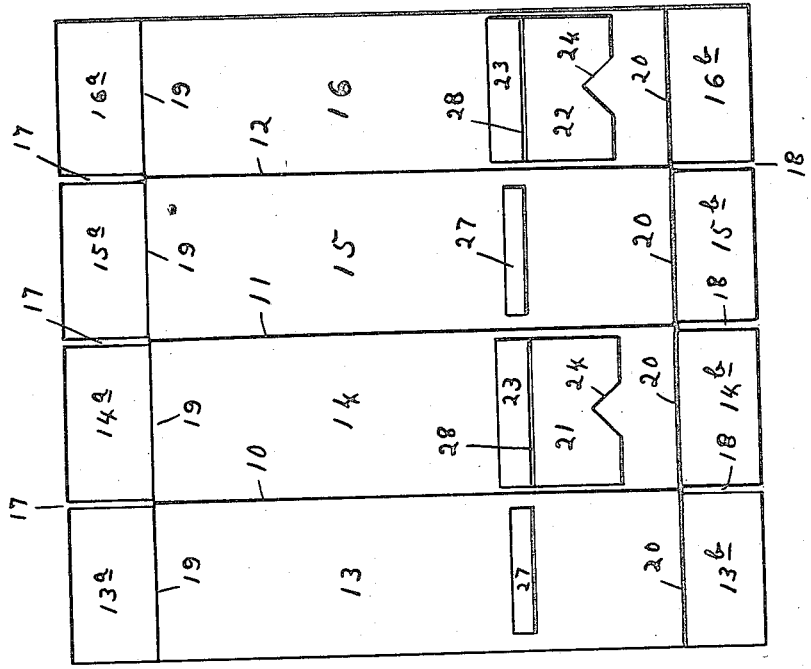
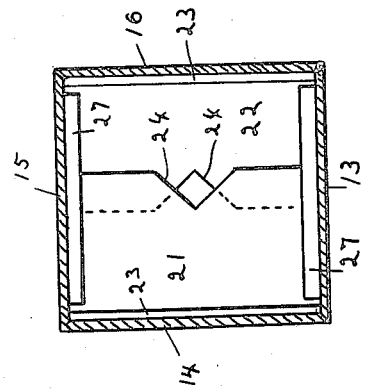
Inventor
Clayton E. Risley
By Martin & Rendell
Attorneys Oct. 2, 1923.  
C. E. RISLEY  
PACKING BOX FOR POTTED PLANTS  
Filed July 14, 1921  
1,469,536  
2 Sheets-Sheet 2
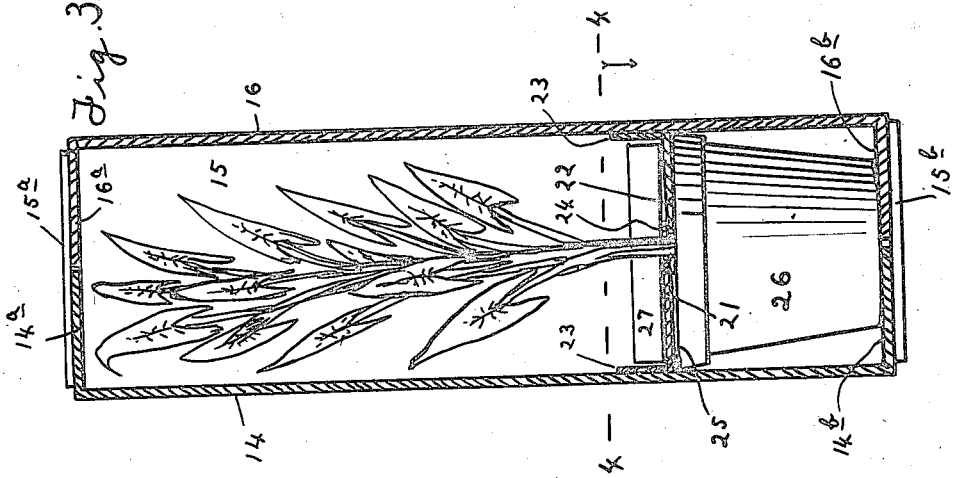
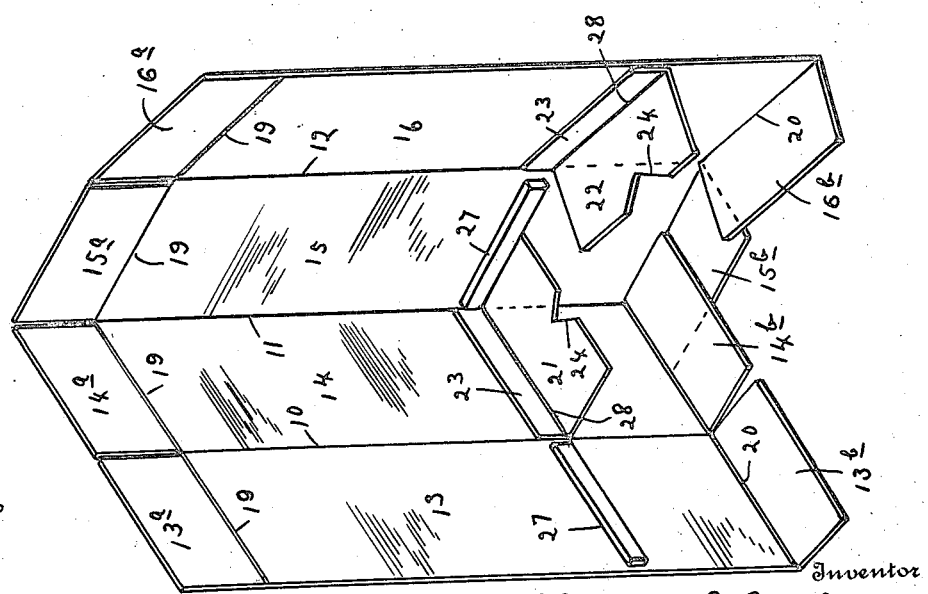
Inventor  
Clayton E. Risley  
By Martin & Rendell  
Attorneys Patented Oct. 2, 1923.

1,469,536

UNITED STATES PATENT OFFICE.

CLAYTON E. RISLEY, OF HAMILTON, NEW YORK.

PACKING BOX FOR POTTED PLANTS.

Application filed July 14, 1921. Serial No. 484,816.

*To all whom it may concern:*

Be it known that I, CLAYTON E. RISLEY, a citizen of the United States, and a resident of Hamilton, in the county of Madison and State of New York, have invented certain new and useful Improvements in Packing Boxes for Potted Plants; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to packing boxes for shipping potted plants.

The purpose of the invention is to provide a packing box which is very simple and economical in construction, readily erected about the potted plant and which then forms a very strong but light box to protect the plant from being crushed and to keep the earth in the pot.

Another object of my invention is to provide a box of the character described wherein practically all of the complete box is formed of one piece of material and wherein the other parts are permanently secured in place upon the main body of the box so that when the greenhouse man desires to box the plant he needs only to pick up one part and not look for additional or supplemental parts.

A still further object is to provide a box of the character described wherein all of the parts of a complete box are permanently connected and wherein the parts to make a complete box are adapted to lie out flat before being erected or may be again laid out flat after the box is used so that the boxes may be readily shipped or stored in knockdown condition in a relatively small space.

Another purpose of my invention is to provide a box for shipping potted plants which is capable of being very quickly assembled without special skill and which will afford a maximum amount of protection to the plant.

Further advantages and purposes of my invention will appear from the specification and claims herein.

Fig. 1 is a plan view of a box embodying my invention and showing the parts laid out flat.

Fig. 2 is an isometric projection showing the box partly erected and in position to receive the potted plant.

Fig. 3 is a vertical central sectional view through the box when completely erected and containing the potted plant.

Fig. 4 is a horizontal sectional view on line 4—4 of Fig. 3.

Referring to the drawings in a more particular description it will be seen that the box has a main body portion formed of a single rectangular piece of the proper size and proportion of suitable material such as box-board or paper-board preferably paper-board of the double face corrugated style. This main body portion is scored longitudinally along three lines as 10, 11 and 12 so as to form the four sides 13, 14, 15 and 16 respectively of the box with the sides being preferably of substantially equal width. The scoring is of such character relative to the material that the said main body portion may be readily bent at right angles along each of the score lines to form the box. The main body portion, moreover, provides end pieces $13^a$, $14^a$, $15^a$, $16^a$, $13^b$, $14^b$, $15^b$ and $16^b$ at the top and bottom respectively of each of the sides 13, 14, 15 and 16 and integral with the respective sides. This is done by making slits 17 and 18 into the top and bottom edge respectively of the main body portion in line with the score lines 10, 11 and 12 and then scoring the body portion cross-wise on the lines 19 and 20 of the inner end of said slits 17 and 18.

To two preferably non-adjacent sides such as 14 and 16 there are permanently secured in hinged relation the partition flaps 21 and 22. These flaps may conveniently be formed of the same material as the body of the box and of about the proportions shown in the drawings with a base-piece 23 divided from the flap 21 or 22 proper by a score line 28 whereby the flap may be readily bent at right angles to the base portion 23, it being understood that the base portion 23 is glued or otherwise permanently fastened to the sides 14 and 16. The said flaps 21 and 22 are provided in their free edges with stem-receiving notches 24 about midway the length of the free edge. Preferably also the flaps 21 and 22 will be of the width from their hinging line 24 a little greater than half the width of the box so that when the box is erected about a plant as shown in Figs. 3 and 4 the flaps overlap thus strengthening the edges of the flap and making a tight joint through which earth from the pot cannot work.

The flaps 21 and 22 are secured to their respective sides at such distance up from the bottom of the box as to have the flaps fit tightly down against the top edge 25 of the flower pot 26.

Upon the other two sides, namely, 13 and 15, there are secured cleats 27 arranged transversely of the box and with their lower edge about on a line with the hinge or score-line 24 of the flaps 21 and 22. These cleats may conveniently be formed of small pieces of wood glued or otherwise permanently secured to the said sides 13 and 15. Their length is a little less than the width of the sides so as not to interfere with the adjacent sides being folded sharply at right angles to each other.

When the box is assembled about the plant these cleats engage the outer or end edges of the flaps 21 and 22 on the top thereof as clearly appears from Figs. 2 and 3 and in an obvious manner hold said flaps closely down upon the top of the flower pot and prevent the weight of the flower pot from shoving the flaps up to an angle greater than a right angle.

When the boxes are made they may conveniently be left flat and inasmuch as the flaps 21 and 22 are adapted to lie flat against their respective sides as shown in Fig. 1 the parts of the boxes can be stored or shipped in very compact and economical form.

In use a box will be partly erected more or less to the stage indicated in Fig. 2 with the two inner sides folded and with one flap as 21 up against the cleat 27 upon the side 15 and with the bottom end-pieces 14$^b$ and 15$^b$ over-lapping to receive the bottom of the flower pot. The box will then be completed in an obvious manner by folding in the side 16 with its flap 22 above the flower pot and beneath the cleat 27; then the last side 13 will be closed with its cleat 27 above both flaps 21 and 22. The top and bottom end-pieces may be interfolded in various ways. Upon placing a strong string lengthwise of the box and around the box the box will be held securely in position and will protect the plant from breakage. It will be noted that after a box embodying my invention has been used it may be readily straightened out again and stored or placed with others flat for return or for shipment.

Preferably the end-pieces will be of a width about half the width of the box so that there will be a double layer of the paper-board at the top and bottom of the box. The abutting ends and edges of these end-pieces assist materially in maintaining the sides of the box at right angles to each other.

What I claim as new and desire to secure by Letters Patent is:

1. In a packing box for potted plants the combination of a main body portion of relatively stiff material adapted to be bent along three longitudinal lines and form the four sides of the box, with short slits into the opposite ends of said body portion along the line of said bends and adapted to be bent along the bottom of said slits to provide integral end portions at the top and bottom of each side, two partition flaps each having a portion permanently secured flatwise to the inner surface of opposite sides and having a free portion adapted to lie flat against its side or to be extended at right angles to the side and across the top of the flower pot and means on the other sides to keep said flaps extended and against the top of the flower pot.

2. In a packing box for potted plants the combination of a main body portion of relatively stiff material adapted to be bent along three longitudinal lines and form the four sides of the box, with short slits into the opposite ends of said body portion along the line of said bends and adapted to be bent along the bottom of said slits to provide integral end portions at the top and bottom of each side, two partition flaps each having a portion permanently secured flatwise to the inner surface of opposite sides and having a free portion adapted to lie flat against its side or to be extended at right angles to the side and across the top of the flower pot and cleats fixed on the other sides and adapted to keep said flaps extended and against the top of the flower pot.

3. In a packing box for potted plants the combination of a main body portion of relatively stiff material adapted to be bent along three longitudinal lines and form the four sides of the box, with short slits into the opposite ends of said body portion along the line of said bends and adapted to be bent along the bottom of said slits to provide integral end portions at the top and bottom of each side, two partition flaps each having a portion permanently secured flatwise to the inner surface of opposite sides and having a free portion adapted to lie flat against its side or to be extended at right angles to the side and across the top of the flower pot and to over-lap each other and cleats fixed on the other sides and adapted to keep said flaps extended and against the top of the flower pot.

4. In a packing box for potted plants the combination of a main body portion of relatively stiff material adapted to be bent along three longitudinal lines and form the four sides of the box, with short slits into the opposite ends of said body portion along the line of said bends and adapted to be bent along the bottom of said slits to provide integral end portions at the top and bottom of each side, two partition flaps each having a portion permanently secured flatwise to the inner surface of opposite sides and having a free portion adapted to lie flat against its side or to be extended at right angles to the side and across the top of the flower pot and means fixed on the other sides and projecting slightly therefrom and adapted to keep said flaps extended and against the top of the flower pot.

5. In a packing box for potted plants the combination of a main body portion of relatively stiff material adapted to be bent along three longitudinal lines and form the four sides of the box, with short slits into the opposite ends of said body portion along the line of said bends and adapted to be bent along the bottom of said slits to provide integral end portions at the top and bottom of each side, two partition flaps each having a portion permanently secured flatwise to the inner surface of opposite sides and having a free portion adapted to lie flat against its side or to be extended at right angles to the side and across the top of the flower pot, said flaps being provided with central notches in their free edges and means fixed on the other sides and projecting slightly therefrom and adapted to keep said flaps extended and against the top of the flower pot.

6. In a packing box for potted plants the combination of a main body portion of relatively stiff material adapted to be bent along three longitudinal lines and form the four sides of the box, with short slits into the opposite ends of said body portion along the line of said bends and adapted to be bent along the bottom of said slits to provide integral end portions at the top and bottom of each side, two partition flaps each having a portion permanently secured flatwise to the inner surface of opposite sides and having a free portion adapted to lie flat against its side or to be extended at right angles to the side and across the top of the flower pot, said flaps having their free edges over-lap each other and provided with a stem-receiving notch in their free edges and means fixed on the other sides and projecting slightly therefrom and adapted to keep said flaps extended and against the top of the flower pot.

In witness whereof I have affixed my signature, this 5th day of July, 1921.

CLAYTON E. RISLEY.